United States Patent [19]
Blair

[11] 3,722,722
[45] Mar. 27, 1973

[54] SELF-PROPELLED BALE HANDLING APPARATUS

[76] Inventor: Calvin B. Blair, P.O. Box 76, Barnard, Kans.

[22] Filed: Apr. 5, 1971

[21] Appl. No.: 131,096

[52] U.S. Cl. ............... 214/522, 198/7 BL, 214/83.26
[51] Int. Cl. ............................................. B60p 1/38
[58] Field of Search...214/83.26, 521, 522; 198/7 BL

[56] References Cited

UNITED STATES PATENTS

| | | | |
|---|---|---|---|
| 3,341,039 | 9/1967 | Cranage | 214/83.36 |
| 3,448,879 | 6/1969 | Van der Lely | 214/83.36 X |
| 3,539,067 | 11/1970 | Secrist | 214/83.36 X |
| 3,593,868 | 7/1971 | Folz | 214/356 |
| 3,493,136 | 2/1970 | Spellman, Jr. | 214/522 X |

*Primary Examiner*—Albert J. Makay
*Attorney*—Fishburn, Gold & Litman

[57] ABSTRACT

A self-propelled vehicle has a flat elevated bed with a conveyor extending therealong from front to back. An elongated header extends forwardly and downwardly from the bed front, riding on the ground at the front end, and has a conveyor chain thereon coordinated with the bed conveyor. Structure is provided for funneling hay bales onto the header and holding the bales in proper position thereon for transmission to the rear end of the bed for stacking. The conveyors may be reversed and the header elevated, with an extension fitted thereon, for off-loading from the bed.

4 Claims, 8 Drawing Figures

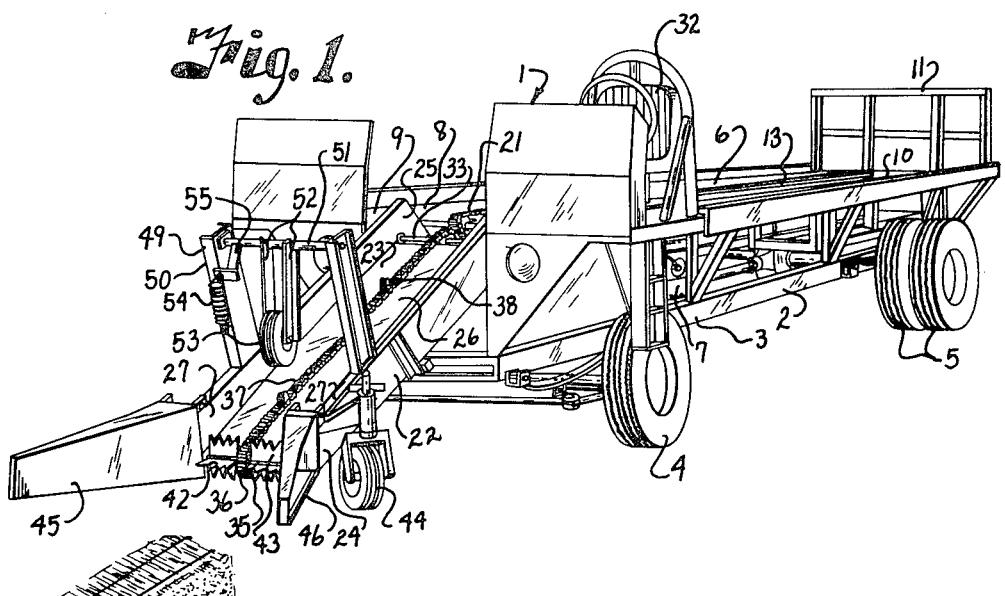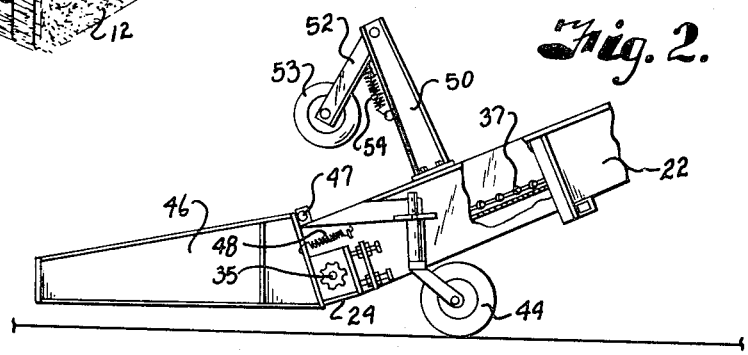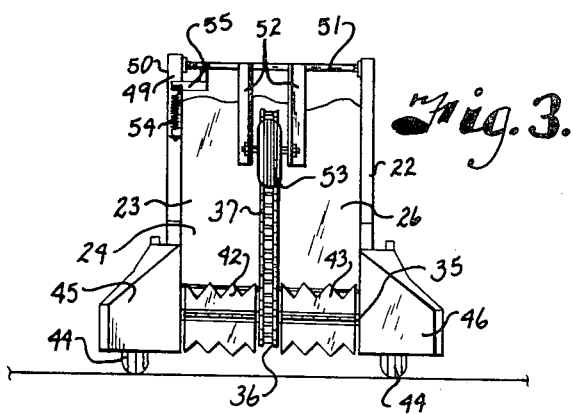

INVENTOR.
Calvin B. Blair

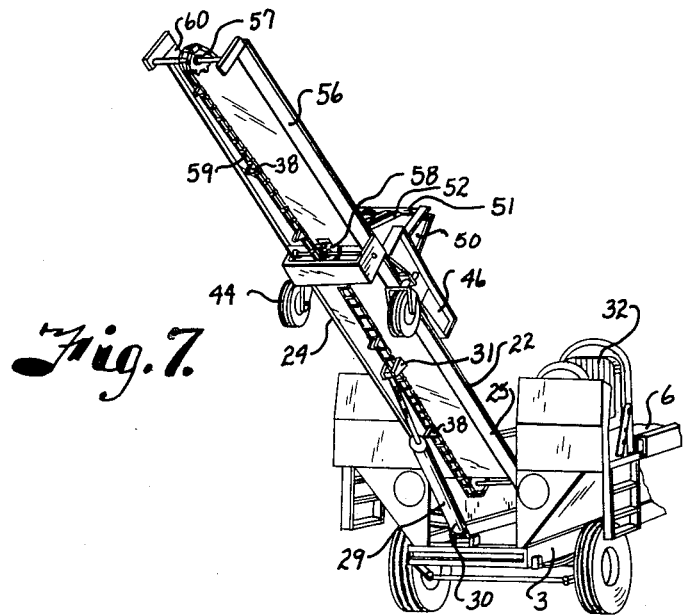
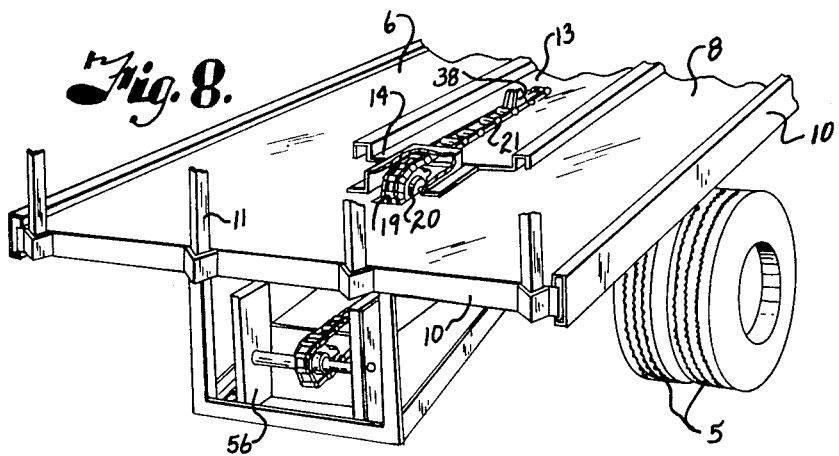
INVENTOR.
Calvin B. Blair

SELF-PROPELLED BALE HANDLING APPARATUS

This invention relates to bale handling apparatus and more particularly to a self-propelled bale handler having the ability to pick-up bales lying in the field at relatively high speed and off-load the bales after receiving a load thereon.

Several types of apparatus have been used for gathering and loading hay bales and the like deposited in the field by a bales, however, heretofore they have exhibited disadvantages such as, excess complexity, requiring large amounts of hand labor, or requiring two or more separate pieces of apparatus for gathering, consolidating and off-loading.

The principal objects of this invention are: To provide bale handling apparatus which easily and quickly picks up bales lying in a field and deposits them on a mobile bed; to provide such a device which is operable with a minimum of labor; to provide such a device which is easily maneuverable in the field and operable under adverse field conditions; to provide such a device which conveniently offers bale off-loading features and which is relatively simple and inexpensive in construction while being well suited for its intended purpose.

Other objects and advantages of this invention will become apparent from the following description taken in connection with the accompanying drawings wherein are set forth by way of illustration and example certain embodiments of this invention.

FIG. 1 is a perspective view showing a self-propelled bale handling apparatus embodying this invention.

FIG. 2 is a fragmentary side elevation showing a forwardly and downwardly extending header in bale pick-up position.

FIG. 3 is a front elevational view of the structure shown in FIG. 2.

FIG. 7 is a fragmentary perspective view showing the header and extension header elevated for off-loading.

FIG. 8 is a fragmentary perspective view showing the rear portion of the vehicle bed and the conveyor chain thereon.

Figure 4:
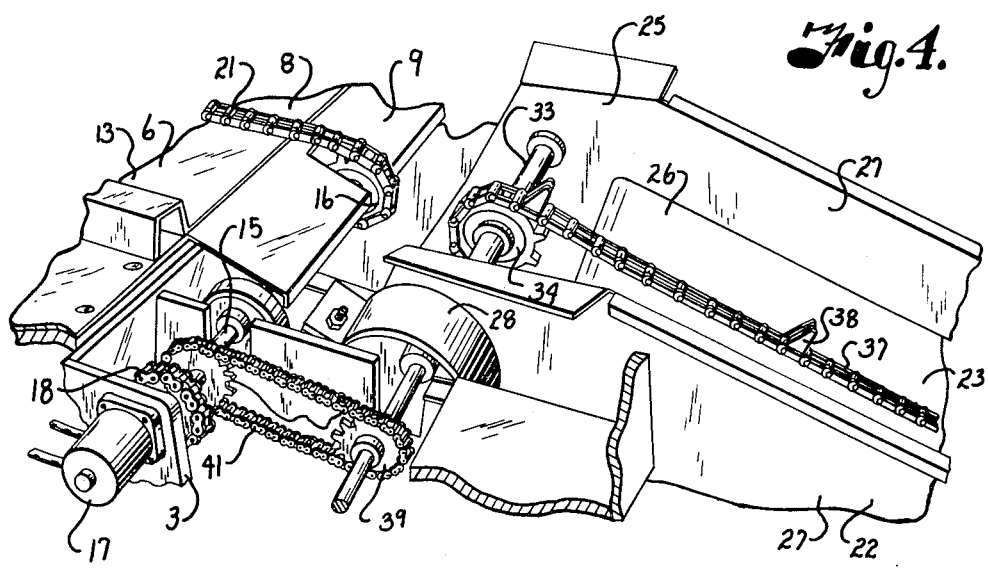
FIG. 4 is a fragmentary perspective view on an enlarged scale showing conveyor drive structure associated with the header and a bed channel.

Referring to the drawings in more detail:

The reference numeral 1 generally indicates bale handling apparatus embodying this invention. The apparatus 1 comprises a vehicle 2 including a frame 3 having steerable front wheels 4 and drivable rear wheels 5 thereon. An elongated horizontal bed 6 is supported on the frame 3 in a position elevated above the wheels 4 and 5. A drive engine 7 of any suitable type is mounted on the frame 3 and beneath the bed 6 and is suitably connected to the rear wheels 5, rendering the apparatus self-propelled and maneuverable in the field.

The bed 6 has an upper surface 8, a front end 9 and a rear end 10. A fence 11 is suitably mounted on the bed rear end 10 and extends upwardly therefrom forming a back-stop for bales 12 to be stacked thereon by a helper (not shown) who rides on the bed 6.

A shallow conveyor channel 13 rests on the bed upper surface 8 and extends longitudinally medially thereof from said bed front end 9 to a position 14 spaced forwardly of the bed rear end 10. A front bed shaft 15 is rotatably and transversely mounted adjacent the bed front end 9 and a sprocket 16 is rotatably fixed thereon medially of the conveyor channel 13. Drive means, in this example an hydraulic motor 17, is mounted on the frame 3 coaxially of the shaft 15 and is connected thereto through a flexible coupling 18 for driving the shaft and sprocket 16 thereon.

The bed 6 has an opening 19 extending vertically therethrough near the bed rear end 10, FIG. 8. A rear sprocket 20 is rotatably mounted in the bed opening 19 in alignment with the front sprocket 16 and an endless conveyor chain 21 is engaged with the sprockets 16 and 20 for movement rearwardly on the conveyor channel 13 when the hydraulic motor 17 drives the sprocket 16 clockwise as viewed in FIG. 4.

A bale pick-up header 22 comprises an elongated trough member 23 having a front end 24, a rear end 25, a floor 26 and upwardly projecting, spaced-apart side rails 27 and 28 extending therealong on each side edge of the floor 26. The header 22 is mounted on the vehicle frame 3 by means of suitable hinging structure 28 for vertical pivotting with the trough member rear end 25 adjacent the bed front end 9. An hydraulic ram 29 is pivotally mounted at one end 30 to the vehicle frame 3 and at the other end 31 to a suitable link secured to the underside of the header 22 in order to vertically pivot the header by suitable remote controls (not shown) for example, located near the driver's seat 32, FIG. 7.

A rear transverse header shaft 33 is rotatably mounted near the trouch rear end 25 and a sprocket 34 is rotatably fixed thereon adjacent the front bed shaft sprocket 16 and medially of the trough floor 26. A front transverse header shaft 25 is rotatably mounted near the trough front end 24 and a sprocket 36 is rotatably fixed thereon in alignment with the rear header shaft sprocket 34. An endless conveyor chain 37 is engaged with the respective rear and front header shaft sprockets 34 and 36 for movement along the header floor 26 through means described below. Spaced teeth 38 are located along the conveyor chain 37 to produce more positive driving engagement with bales 12.

A second sprocket 39 is rotatably fixed to the rear header shaft 33 and a second sprocket 40 is rotatably fixed to the front bed shaft 15 in alignment with the sprocket 39. A drive chain 41 operably connects the sprockets 40 and 41 wherein the header conveyor chain 37 is driven simultaneously with and in the same direction as the bed conveyor chain 21.

Elongated spur members 42 and 43 are rotatably fixed on the front header shaft 35 on each side of the sprocket 36, for rotation therewith. A pair of spaced apart support wheels 44 are pivotally and swivally mounted laterally of the trough member front end 24 supporting same for movement along and adjacent the ground and projecting forwardly and downwardly of the frame bed 6, FIG. 1.

A pair of elongated, forwardly projecting gathering points 45 and 46 are mounted on the trough member front end 24 adjacent the respective side rails 27 and taper laterally outwardly of the side rails forming a funnel for directing the hay bales 12 onto the spur members 42 and 43 as the apparatus 1 is driven forwardly in the field.

Figure 5:
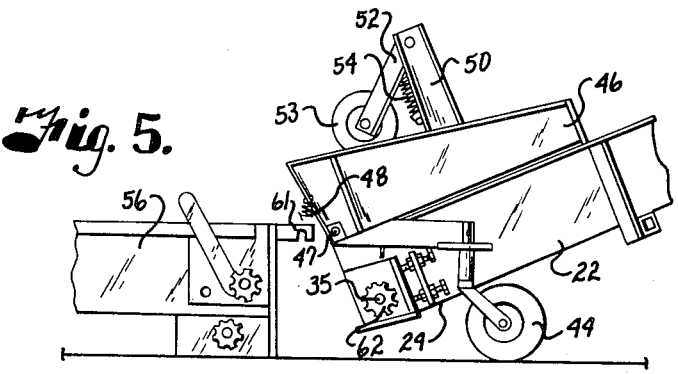
FIG. 5 is a fragmentary side elevational view showing the header about to receive an off-loading extension header thereon.
Figure 6:
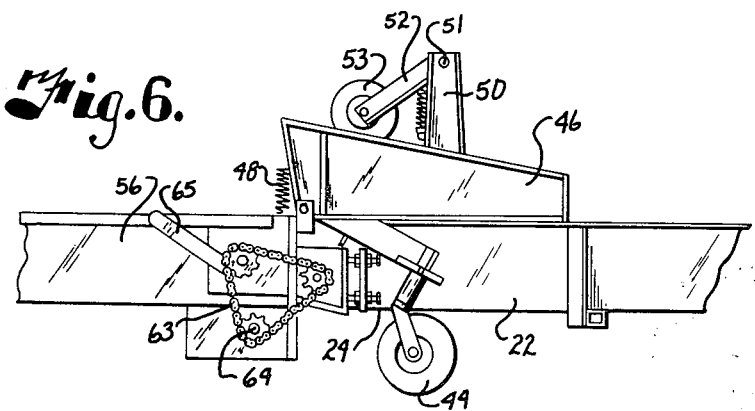
FIG. 6 is a view similar to FIG. 5 but showing the extension header connected.

The gathering points 45 and 46 are secured to the header front end 24 by means of pivotal or hinge members 47, FIG. 2, permitting same to be folded upwardly and rearwardly, to the position shown in FIG. 5 when the gathering points are to be placed out of service for off-loading, described below. Suitable tension springs 48 retain the respective gathering points in a forwardly directed position but permit vertical displacement in case a low obstruction is engaged in the field. The tension springs 48 are disengaged when it is desired to fold the gathering point back as shown in FIG. 5.

A bale hold down structure 49 is mounted on the header 22 near the front end 24 and comprises a pair of uprights 50 projecting from the respective side rails 27. A cross-bar 51 is pivotally mounted on the uprights 50 and extends therebetween. A pair of arms 52 are secured to and project radially from the cross-bar 51 and rotatably support a wheel 53 therebetween. The wheel 53 is normally maintained in a position projecting downwardly and forwardly of the cross-bar 51 as best shown in FIG. 2 by means of a tension spring 54 which draws a limit member 55 into a predetermined position, FIG. 1. The wheel 53, however, is free to pivot upwardly or clockwise as shown in FIG. 2 against the tension of the spring 54 when contacting a bale as described hereinafter.

An extension header 56 is stored during bale pick-up operations beneath the bed 6, FIG. 8, and comprises structure generally similar to the header 22 but adapted to be completely disengaged from the apparatus. The extension header 56 includes rotatably mounted front and rear sprockets 57 and 58, a conveyor chain 59 mounted thereon and trough forming structure 60 generally similar to that described in connection with header 22. Mounting hooks 61 project rearwardly of the extension header 56 and are adapted to engage in a pin extending outwardly from the hinge members 47 to couple the header 22 with the extension header 56 as the former is raised by means of the hydraulic ram 29. A sprocket 62, mounted on the front header shaft 35, forms a drive member which operates through a suitable removable chain 63 to drive a sprocket 64 fixed to the shaft driving the rear extension header sprocket 58. Suitable chain tightening structure 65 permits the application and removal of the chain 63 as needed. When the extension header 56 is to be connected, the gathering points 45 and 46 are folded rearwardly as shown in FIG. 5.

In operation, the bale handling apparatus 1 is driven through the fields with the front end 24 of the pick-up header 22 supported near the ground by means of the wheels 44. A bale 12 is engaged in the funnel formed by the gathering points 45 and 46 and is directed onto the spur members 42 and 43 which pull it upwardly onto the conveyor chain 37. The wheel 53 on the bale hold down 49 engages the upper surface of the bale and prevents it from tipping under the forces created by the moving chain 37. When the bale reaches the top of the pick-up header 22, it is engaged by the chain 21 which directs it rearwardly along the channel 13 toward the rear end portion of the bed where a helper (not shown) picks it up and stacks it along with other bales against, and forwardly of, the fence 11. When the bed 6 is loaded to capacity, the apparatus 1 may be driven to an unloading location. The hydraulic motor 17 may then be reversed and, by elevating the pick-up header 22 the apparatus becomes an off-loader for use as desired. If the off-loading is to be onto a high stack or in a high loft which cannot be reached by the header 22, the extension header 56 is used to extend the reach.

It is to be understood that while one form of this invention has been illustrated and described it is not to be limited thereto except insofar as such limitations are included in the following claims.

What I claim and desire to secure by Letters Patent is:

1. Bale handling apparatus comprising:
   a. a steerable, self-propelled vehicle including a frame, an elongated horizontal bed supported on said frame, said bed having an upper surface, a front end and a rear end, a shallow bale conveyor channel on said bed upper surface and extending longitudinally thereof from said bed front end to a position spaced forwardly of said bed rear end, an endless conveyor chain extending along said channel, reversible drive means for driving said channel conveyor chain along said channel;
   b. a bale pick-up header comprising an elongated trough member having a front end, a rear end, a floor and upwardly projecting spaced apart side rails extending therealong, said header being mounted on said vehicle frame for vertical pivotting with said trough member rear end adjacent said bed front end, an endless conveyor chain extending along said trough member floor and operable connected to said drive means for simultaneous movement with said channel conveyor chain,
   c. a pair of spaced apart support members mounted laterally of said trough member front end and supporting same for movement adjacent the ground and projecting forwardly and downwardly of said frame bed;
   d. a pair of forwardly projecting gathering points mounted on said trough member front end adjacent said respective side rails, said gathering points tapering laterally outwardly of said side rails and forming a funnel for directing hay bales onto said trough member front end, said gathering points being pivotally mounted to said trough member front end for folding rearwardly thereof; and
   e. a conveyor extension member adapted for operative engagement with said header front end and extending the reach of said header for off-loading.

2. The apparatus as set forth in claim 1 wherein:
   a. said support members mounted on said trough member front end are rotatably and swivally mounted wheels.

3. A bale handling apparatus comprising:
   a. a steerable, self-propelled vehicle including a frame, an elongated horizontal bed supported on said frame, said bed having an upper surface, a front end and a rear end, a shallow bale conveyor channel on said bed upper surface and extending longitudinally thereof from said bed front end to a position spaced forwardly of said bed rear end, an endless conveyor chain extending along said channel, reversible drive means for driving said channel conveyor chain along said channel;

b. a bale pick-up header comprising an elongated trough member having a front end, a rear end, a rear end, a floor and upwardly projecting spaced apart side rails extending therealong, said header being mounted on said vehicle frame for vertical pivotting with said trough member rear end adjacent said bed front end, an endless conveyor chain extending along said trough member floor and operably connected to said drive means for simultaneous movement with said channel conveyor chain;

c. a pair of spaced apart support members mounted laterally of said trough member front end and supporting same for movement adjacent the ground and projecting forwardly and downwardly of said frame bed;

d. a pair of forwardly projecting gathering points mounted on said trough member front end adjacent said respective side rails, said gathering points tapering laterally outwardly of said side rails and forming a funnel for directing hay bales onto said trough member front end; and e. a conveyor extension member for off-loading adapted for engagement with said header front end, said extension member including an endless conveyor chain, and manually operable means for selectively engaging said extension conveyor chain with said header conveyor chain.

4. The apparatus as set forth in claim 3 wherein:

a. said manually operable means includes a removable drive chain and chain tightening structure.

* * * * *